(12) United States Patent
Buettner et al.

(10) Patent No.: US 9,460,746 B2
(45) Date of Patent: Oct. 4, 2016

(54) CREATING A SUB-MICRON PATTERN PROXIMATE A NEAR-FIELD TRANSDUCER USING IN-SLIDER WAVEGUIDE AND LASER

(71) Applicant: Seagate Technology LLC, Cupertino, CA (US)

(72) Inventors: Daniel Richard Buettner, Savage, MN (US); Joseph Michael Stephan, Eden Prairie, MN (US); Douglas Hampton Cole, Burnsville, MN (US); The Ngoc Nguyen, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/724,129

(22) Filed: May 28, 2015

(65) Prior Publication Data

US 2015/0348578 A1    Dec. 3, 2015

Related U.S. Application Data

(60) Provisional application No. 62/004,455, filed on May 29, 2014.

(51) Int. Cl.
| | |
|---|---|
| *G11B 5/00* | (2006.01) |
| *G11B 5/48* | (2006.01) |
| *G11B 5/60* | (2006.01) |
| *G11B 13/08* | (2006.01) |
| *G11B 5/31* | (2006.01) |
| *G11B 5/105* | (2006.01) |

(52) U.S. Cl.
CPC ............ *G11B 5/6088* (2013.01); *G11B 5/314* (2013.01); *G11B 5/4866* (2013.01); *G11B 13/08* (2013.01); *G11B 5/105* (2013.01); *G11B 2005/0021* (2013.01)

(58) Field of Classification Search
CPC .................... G11B 5/6082; G11B 2005/0021; G11B 5/4866; G11B 5/314; G11B 5/6088; G11B 2005/001; G11B 7/1387; G11B 5/3116; G11B 11/10554; G11B 5/3133; G11B 13/08; G11B 7/1384; G11B 5/105
USPC ............................... 369/13.33, 13.13, 112.27
See application file for complete search history.

(56) References Cited

U.S. PATENT DOCUMENTS

| | | | | |
|---|---|---|---|---|
| 7,796,353 | B2 * | 9/2010 | Schabes ................. | B82Y 10/00 360/59 |
| 8,509,037 | B1 * | 8/2013 | Huang ................... | G11B 5/314 360/59 |
| 8,750,082 | B1 * | 6/2014 | Shimazawa ............ | G11B 5/314 369/13.13 |

\* cited by examiner

*Primary Examiner* — Ali Neyzari
(74) *Attorney, Agent, or Firm* — Hollingsworth Davis, LLC (57) ABSTRACT

An air-bearing surface of a slider is coated with a photoresist having a high optical absorbance at or near an operational wavelength of the slider. Light is directed at a target wavelength through an entry of a waveguide integrated into the slider. The light exiting the waveguide forms a feature through the photoresist, the feature proximate a near-field transducer of the slider. A sub-micron pattern is formed using the feature.

20 Claims, 12 Drawing Sheets

CREATING A SUB-MICRON PATTERN PROXIMATE A NEAR-FIELD TRANSDUCER USING IN-SLIDER WAVEGUIDE AND LASER

RELATED PATENT DOCUMENT

This application claims the benefit of Provisional Patent Application Ser. No. 62/004,455 filed May 29, 2014, to which priority is claimed pursuant to 35 U.S.C. §119(e), and which is incorporated herein by reference in its entirety.

SUMMARY

Embodiments of the disclosure involve coating an air-bearing surface of a slider with a photoresist having a high optical absorbance at or near an operational wavelength of the slider. Light is directed at a target wavelength through an entry of a waveguide integrated into the slider. The light exiting the waveguide forms a feature through the photoresist, the feature proximate a near-field transducer of the slider. A sub-micron pattern is formed using the feature.

According to various embodiments, an air bearing surface of a slider is coated with a photoresist having high optical absorbance at or near an operational wavelength of the slider. Light is directed at a target wavelength through an entry of a waveguide integrated into the slider. The light exiting the waveguide forms a feature through the photoresist, the feature proximate a near-field transducer of the slider. A localized step is formed using the feature.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

This disclosure generally relates to manufacture of optical devices used in heat-assisted media recording (HAMR) hard disk drives. A HAMR read/write element, sometimes referred to as a slider or read/write head, includes magnetic read and write transducers similar to those on current hard drives. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a near-field transducer (NFT) proximate a media-facing surface (e.g., air-bearing surface, contact surface). The NFT shapes and transmits the energy to a small region on the medium. The NFT is sometimes referred to as an optical antenna, surface plasmon resonator, etc., and may include a plasmonic metal such as gold, silver, copper, aluminum, etc., and alloys thereof. The NFT for a HAMR device is very small (e.g., on the order of 10 to 1000 nm) and creates a localized region of high power density in the media through an electromagnetic interaction. This results in a high temperature rise in a small region on the media, with the region exceeding the Curie temperature having dimensions less than 100 nm. This also results in high temperature rise in the slider near the NFT due to optical losses in the recording head.

Figure 1:
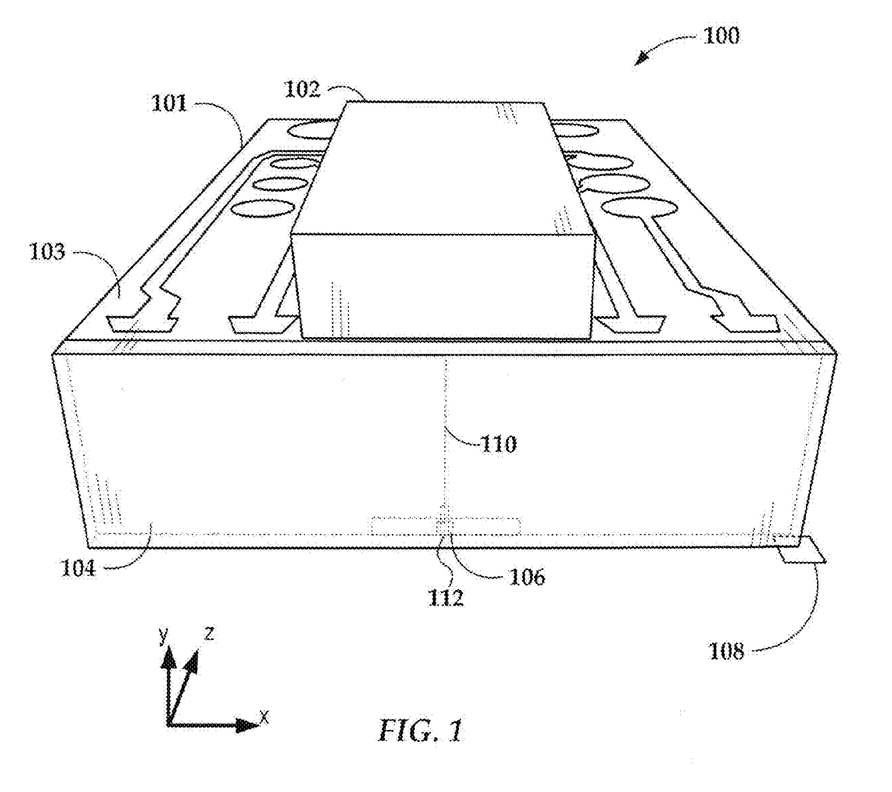
FIG. 1 illustrates a perspective view shows HAMR recording head according to some embodiments described herein.

In reference to FIG. 1, a perspective view shows HAMR recording head 100 according to an example embodiment. The recording head 100 (also sometimes referred to as a slider) includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a NFT 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point at or near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
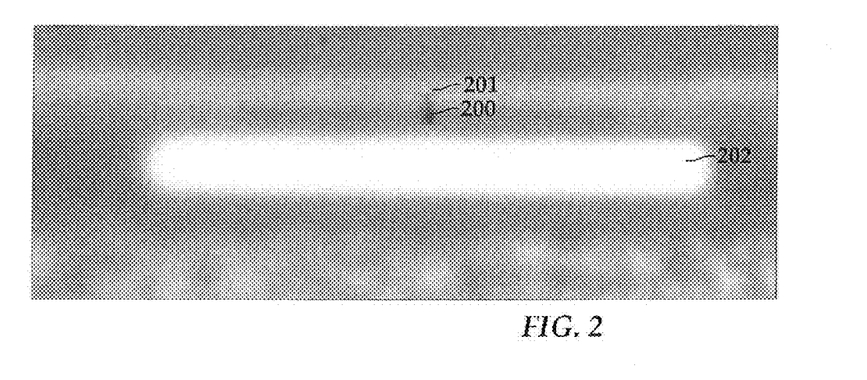
FIG. 2-4 show a microscope image of a slider ABS in accordance with some embodiments.
Figure 3:
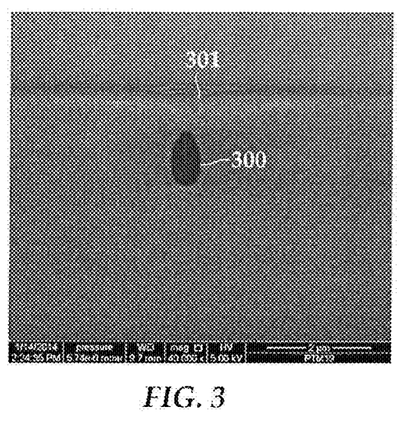
Figure 4:
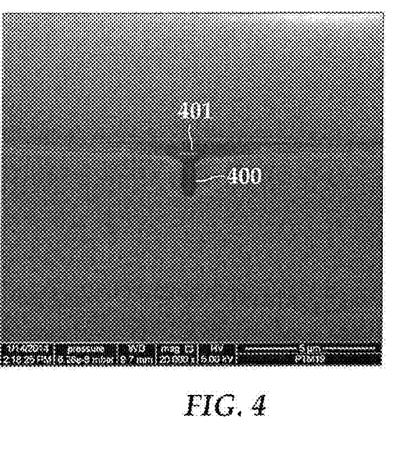

In FIG. 2, a microscope image of a slider ABS is shown. The present disclosure relates to creating a feature 200 at the ABS proximate the NFT 201. This feature 200 was formed by making a circular hole (although other shapes may be possible) through the photoresist and then forming a sub-micron pattern (e.g., a localized step, resist pillar, nano-pillar, etc.) which is aligned with the NFT 201 at a core of the waveguide (behind the feature 200). The sub-micron pattern may be formed from a material such as a tantalum oxide (TaOx) and provides thermal protection of the NFT 201 during operation. The feature 200 is located at or adjacent the NFT. A shield 202 is located proximate the feature 200. In FIGS. 3 and 4, close up electron microscope views of slider ABSs show respective features 300, 400 proximate to waveguide cores 301, 401. Generally, the fabrication process will target forming features similar to feature 400, e.g., close to the NFT, such that the sub-micron pattern formed using the feature 400 abuts the NFT.

Figure 5:
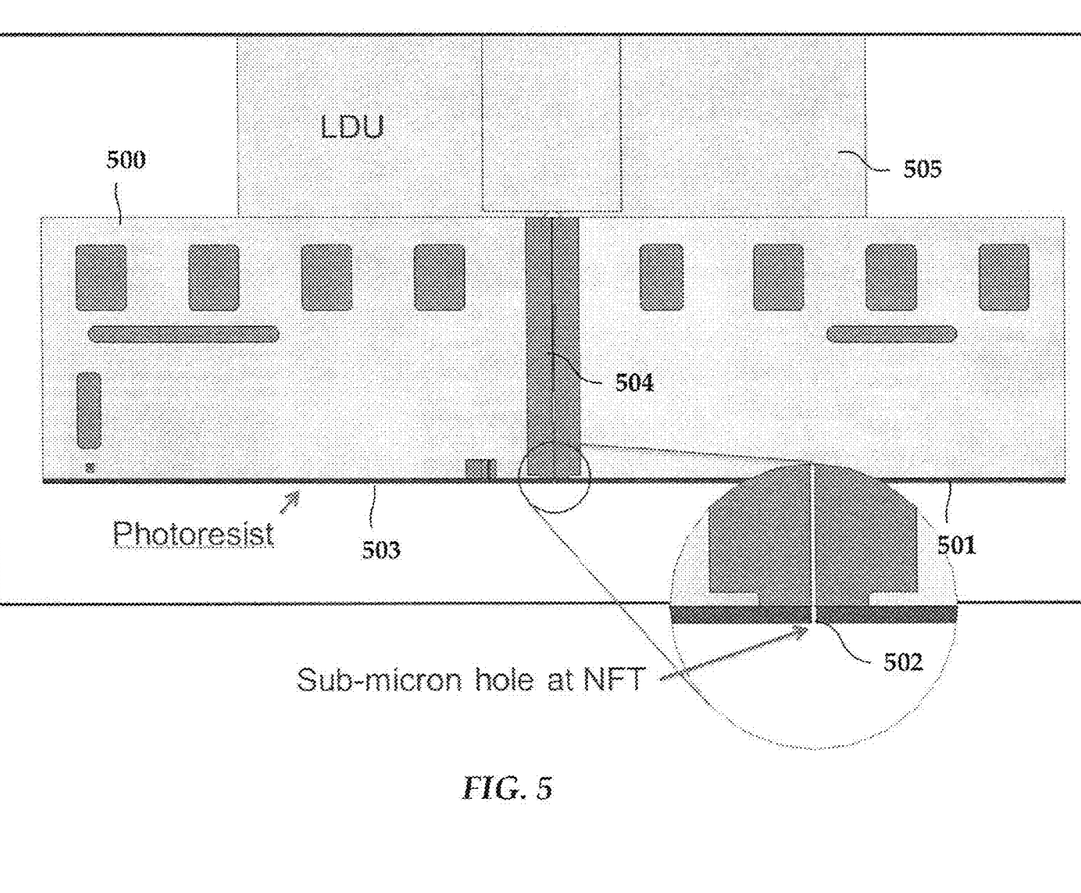
FIG. 5 illustrates a cross sectional view of slider body that shows how a sub-micron pattern can be formed at the ABS according to some embodiments.

The features as shown in FIGS. 2-4 are formed using the in-slider waveguide and an energy source. In FIG. 5, a cross sectional view of slider body 500 illustrates how a sub-micron pattern 502 can be formed at the ABS 501. A layer of photoresist 503 is coated over the ABS 501. A light source unit 505 is optically coupled to a waveguide 504 that extends to the ABS 501. The light source unit 505 provides light at or near a wavelength of light which the slider uses during operation to heat the recording media. In this example, the wavelength is 830 nm. The laser light is coupled to the waveguide 504, and exiting light forms the feature 502 through the photoresist layer 503. The feature 502 can then be filled with a protective material such as TaOx or another transparent oxide as part of a step-head overcoat process, such as a positive or negative inverted step process.

The photoresist 503 is selected to be effective (e.g., have high optical absorbance) at a wavelength to which the waveguide 504 and laser diode unit 505 are tuned for operation (operational wavelength). In this example, the wavelength of laser light was 830 nm, which is significantly larger wavelength than what is often used in photoresist exposures, e.g., around 400 nm. By using a wavelength for which the waveguide 504 is designed, the feature 502 can be formed precisely, e.g., sub-micron feature size 60% smaller than the current best-in-class using conventional exposures on bar-level assemblies. This is due at least in part to reduction of stray light due to the matching of the light wavelength with the waveguide. Further, the feature 502 is precisely aligned to the waveguide 504, which itself is precisely aligned to the NFT.

Figure 6:
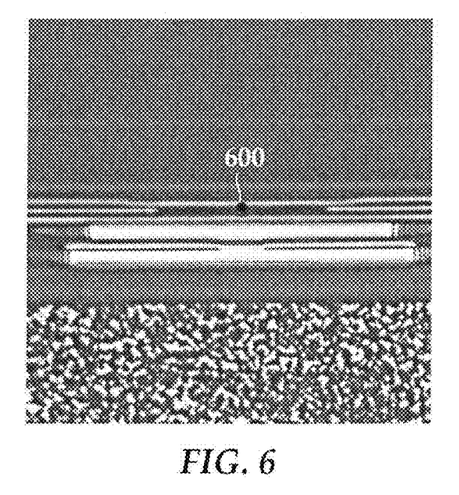
FIGS. 6-8 show images taken at the ABS in accordance with some embodiments.
Figure 7:
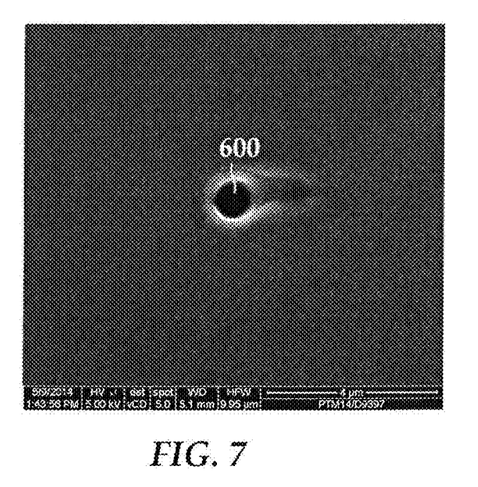
Figure 8:
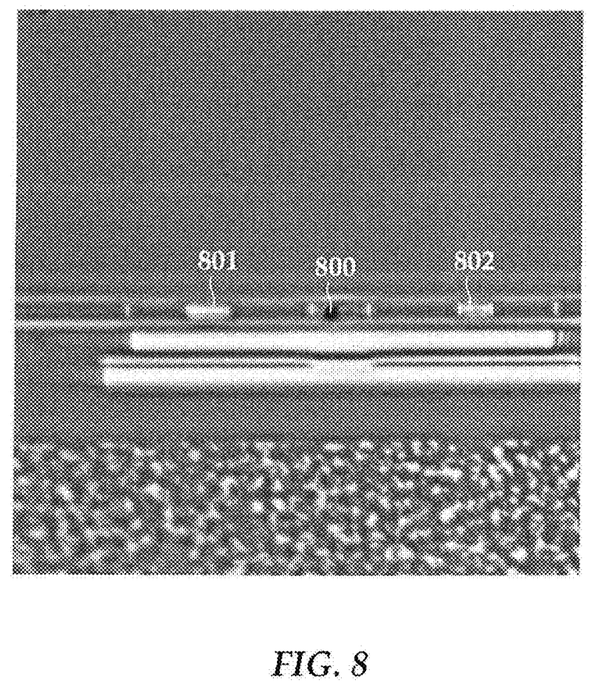

A proof of concept was performed using laser-on-slider assemblies, the results of which are shown in FIGS. 2-4 and 6-8, which are images (optical and electron microscopy) taken at the ABS. These figures demonstrate the sub-micron pattern can effectively be formed using a slider-mounted laser diode unit. In FIGS. 6 and 7, the feature 600 is formed in a top-to-bottom straight-through channel waveguide with no solid-immersion mirror (SIM) used for focusing. The diameter of the feature 600 is 850 nm. In FIG. 8, a feature 800 is formed on a slider that utilizes a waveguide that focuses into a SIM. Exposed SIM portions 801, 802 can be seen in the image flanking the feature 800 in a crosstrack direction.

Figure 9:
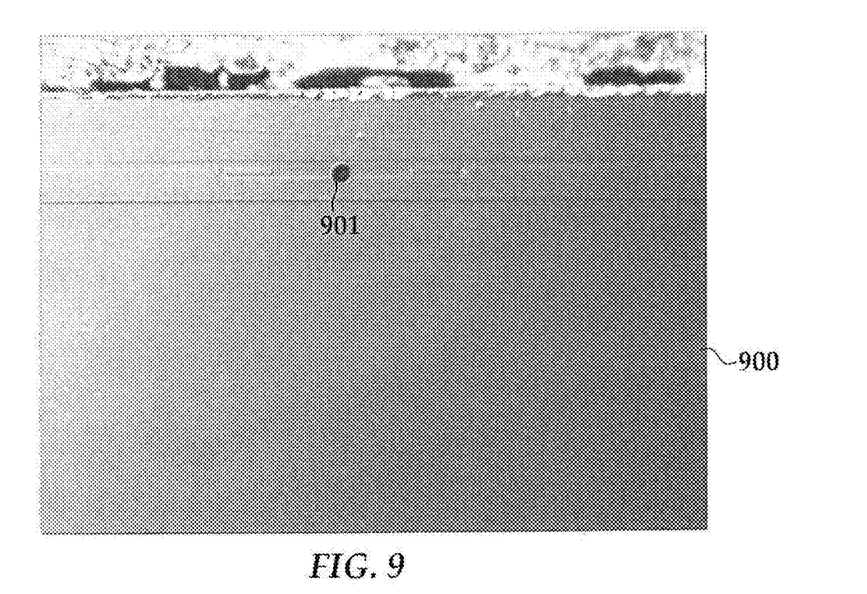
FIGS. 9-11, illustrate how features can be formed at a bar-level assembly in accordance with some embodiments.
Figure 10:
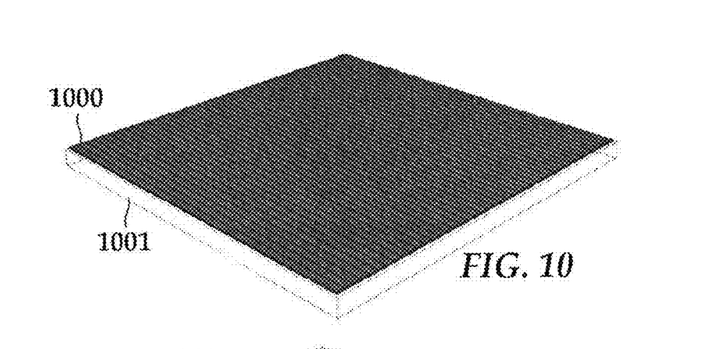
Figure 11:
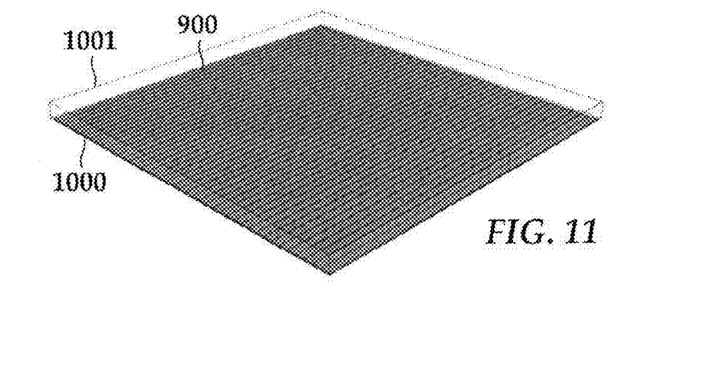

The illustrated features were made on individual sliders using operational lasers, e.g., lasers suitable for use in heating recording media. In large-scale production, the sub-micron patterns may be formed at a bar level, e.g., all or part of a wafer that includes a large number of slider bodies in an array. In FIGS. 9-11, an example is shown for how these features can be formed at a bar-level assembly. In FIG. 9, an example portion of a hardmask 900 is shown. The hardmask 900 is a layer of light-masking material of non-magnetic material (e.g., opaque material such as Au) and includes a hole 901 for light control. The hole 901 helps reduce stray light in addition to the aforementioned matching of laser light to the waveguide. The hole 901 is positioned over entries to waveguide of the slider, which generally may include a laser-to-waveguide coupling region on top of the slider (or any other surface of the slider where the laser would be coupled after final assembly). The hole 901 in this example is 5 um.

As seen in FIGS. 10 and 11, the bar array 1000 of sliders is mounted on a transparent (e.g., quartz) plate 1001. The Au mask 900 is located between the bar array 1000 and transparent plate 1001. The ABS side of the bar array 1000 is coated with a thin layer of resist that has high optical absorbance at or near an operational wavelength of the slider waveguides. The wavelength can be different from the operational wavelength to the extent that it does not generate significant stray light (e.g., +−5% to 15%). The transparent plate 1001 can be exposed (e.g., blanket exposed) to light at or near the operational wavelength of the slider waveguides. Thereafter, the sub-micron pattern can be formed at the ABS side of the bar array 1000 as previously described.

Figure 12A:
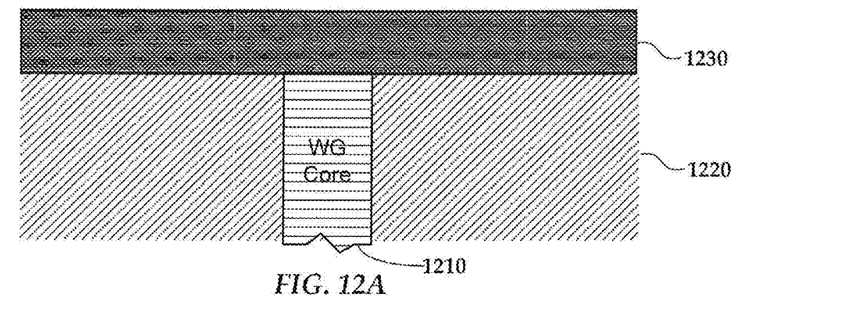
FIGS. 12A-12B illustrate a process for forming a feature through a photoresist in accordance with embodiments described herein.
Figure 12B:
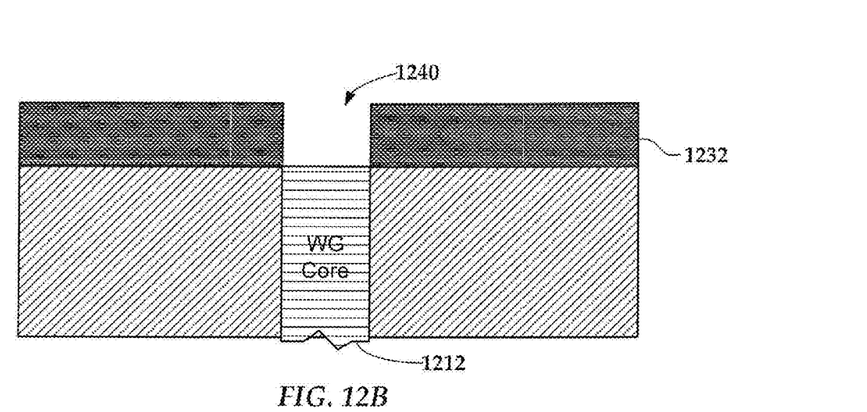

FIGS. 12A and 12B illustrate a process for forming a feature through a photoresist in accordance with embodiments described herein. A portion of the waveguide core 1210, 1212, 1214 is shown. In FIG. 12A a photoresist layer 1230 is located proximate the waveguide core 1210. Cladding layers 1220 surround at least a portion of the waveguide core 1210. Light exiting the waveguide core 1210, 1212, 1214 causes the sections of photoresist that are exposed to the light to be sensitive to photoresist developer. FIG. 12B illustrates a stage of the process in which the photoresist 1232 has been exposed to light through the waveguide core 1212 and exposed to a photoresist developer, creating the feature 1240. According to various embodiments the portion of the photoresist that is removed to create the feature 1240 is wider than the waveguide core 1212.

Figure 13A:
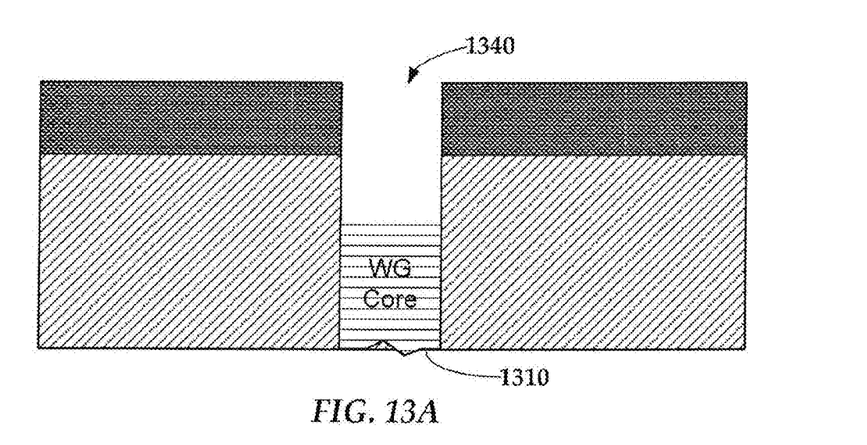
FIGS. 13A-13C show a process for creating a sub-micron pattern by in accordance with some embodiments.
Figure 13B:
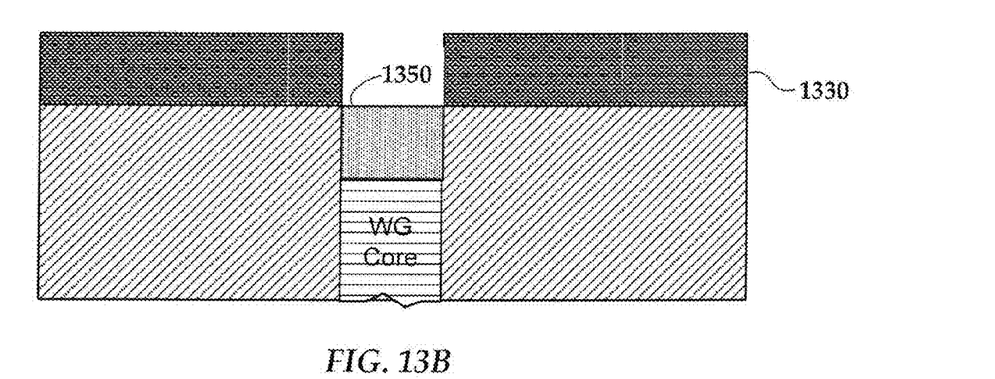
Figure 13C:
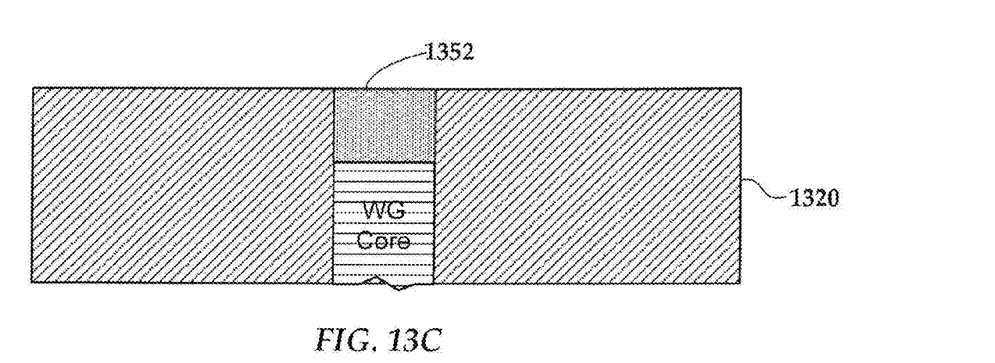

In some cases portion of the waveguide core is also removed. FIG. 13A illustrates a process step in which a portion of the waveguide core 1310 is removed to create the feature 1340. The feature 1340 can be used to create the sub-micron pattern 1350 shown in FIG. 13B. The sub-micron pattern may be formed from a material that includes TaOx, as described above. The remaining part of the photoresist 1330 may be removed leaving the sub-micron pattern 1352 in FIG. 13C. In some cases, a smaller amount or larger amount of the waveguide core is removed such that the sub-micron pattern is not flush with the cladding layers 1320.

Figure 14A:
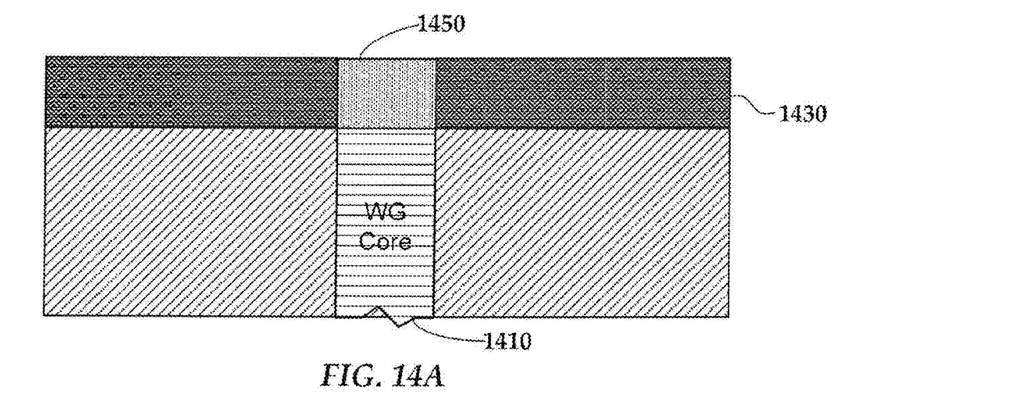
FIGS. 14A-14B illustrate another process for creating a sub-micron pattern according to various embodiments.
Figure 14B:
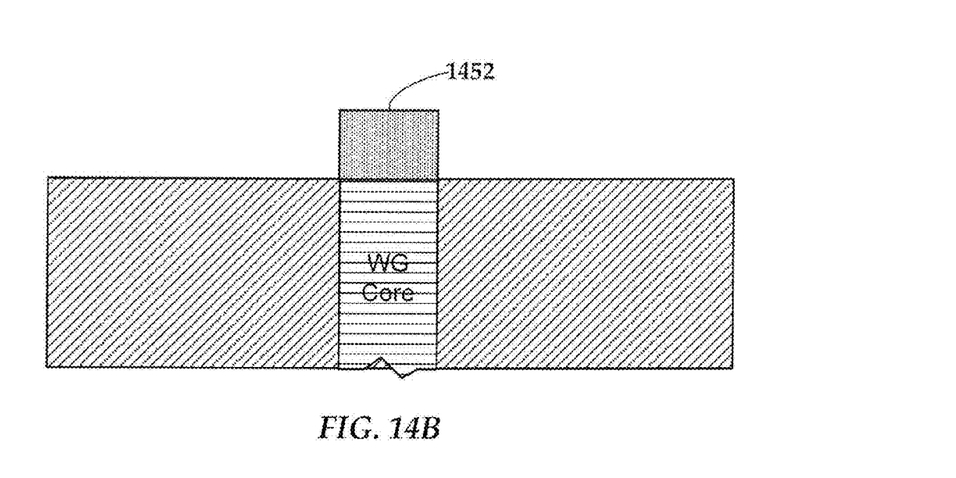

According to some implementations, the sub-micron pattern is formed without removing a portion of the waveguide core. FIGS. 14A and 14B illustrate a process according to various embodiments in which after the portion of the photoresist 1430 that was exposed to light is removed, the sub-micron pattern 1450 is formed proximate to the waveguide core 1410. The remaining photoresist may then be removed, leaving the sub-micron pattern 1452.

Figure 15A:
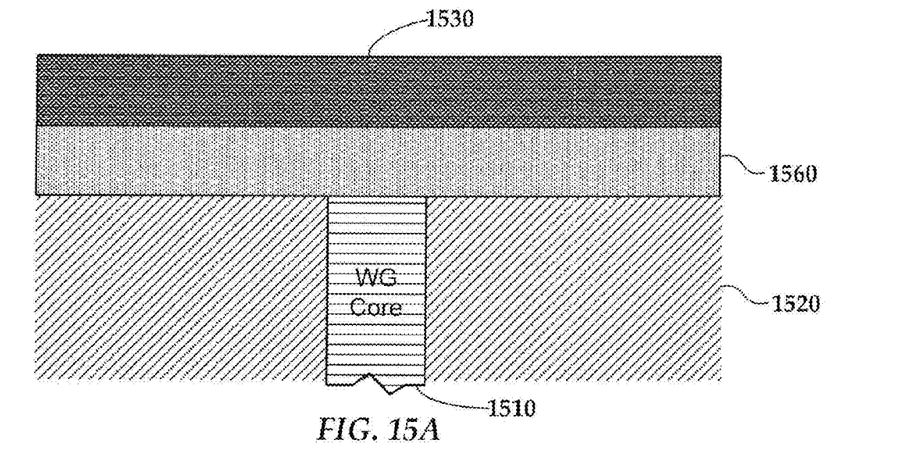
FIGS. 15A-15D illustrate a process for creating a sub-micron pattern using a negative photoresist in accordance with some embodiments described herein.
Figure 15B:
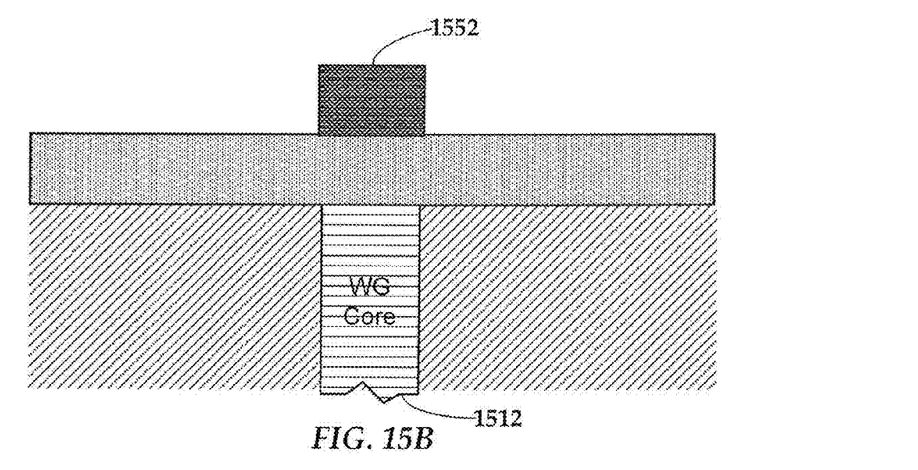
Figure 15C:
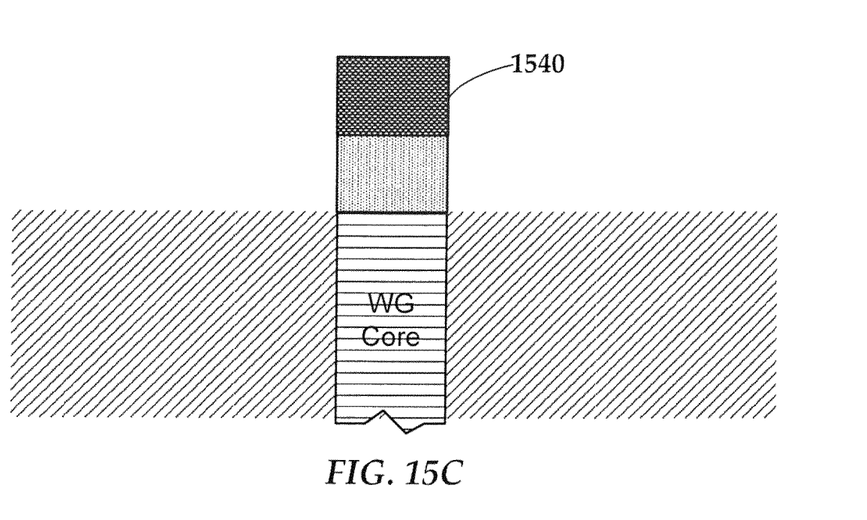
Figure 15D:
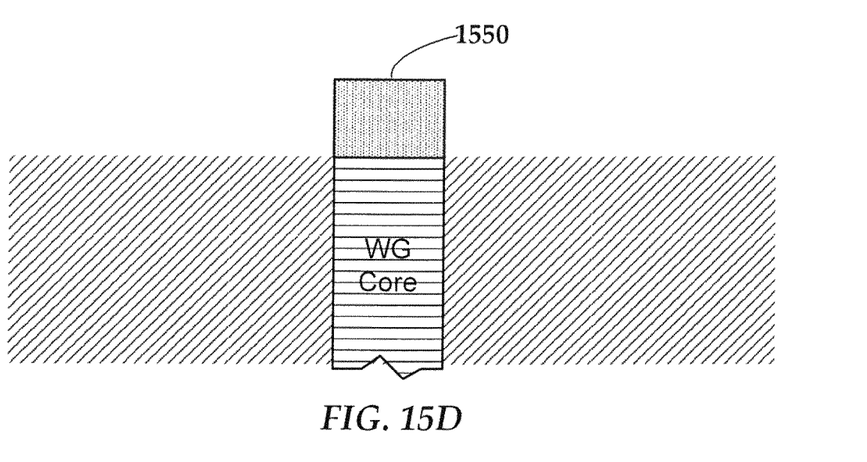

FIGS. 12A-14B illustrated processes that involved using positive photoresists. In some cases, a negative photoresist or a combination of positive and negative photoresists may be used. In a negative photoresist, the portion of the photoresist that is not exposed to light is sensitive to an etchant. FIGS. 15A-15D illustrate a process for creating a sub-micron pattern 1550 using a negative photoresist. A layer of material 1560 used to create the sub-micron pattern (e.g., TaOx) is proximate the waveguide core 1510. A negative photoresist layer 1530 may be proximate the TaOx layer 1560. Light from the waveguide core 1510, 1512 may be used to prevent etching of the photoresist that is exposed to light. FIG. 15B illustrates the process after the photoresist 1552 has been exposed to light and the remaining portion of the photoresist removed. The remaining photoresist is a feature (e.g., resist pillar) 1540 that is used to create the sub-micron pattern 1550. Portions of the TaOx layer around the remaining photoresist feature 1540 may be removed to create the sub-micron pattern 1550. The remaining photoresist feature 1540 may then be removed leaving the sub-micron pattern 1550 as shown in FIG. 15D.

Figure 16:
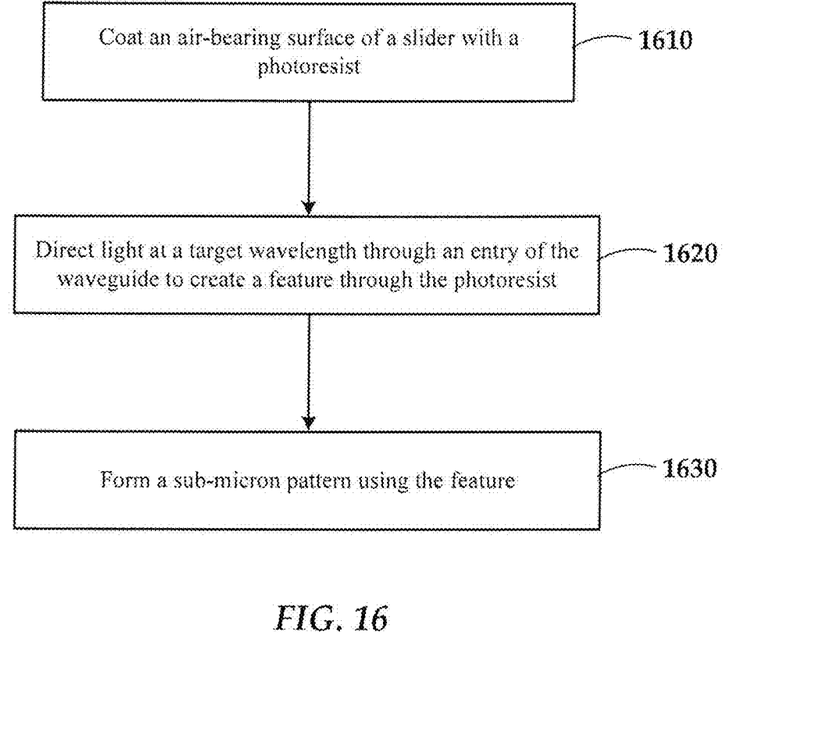
FIG. 16 illustrates a process for creating the sub-micron pattern using a photoresist having high optical absorbance at or near an operational wavelength of the slider according to various embodiments described herein.

FIG. 16 illustrates a process for creating the sub-micron pattern according to various embodiments described herein. An air bearing surface of a slider is coated 1610 with a photoresist having high optical absorbance at or near an operational wavelength of the slider. Light is directed 1620 at a target wavelength through an entry of a waveguide integrated into the slider. The light exiting the waveguide forms a feature through the photoresist. The feature may be proximate a near-field transducer of the slider. A sub-micron pattern is formed 1630 using the feature.

FIGS. 12A-14B illustrated processes that involved using positive photoresists. In some cases, a negative photoresist or a combination of positive and negative photoresists may be used. In a negative photoresist, the portion of the photoresist that is not exposed to light is sensitive to a photoresist developer. FIGS. 15A-15D illustrate a process for creating a sub-micron pattern 1550 using a negative photoresist. A layer of material 1560 used to create the sub-micron pattern (e.g., TaOx) is proximate the waveguide core 1510. A negative photoresist layer 1530 may be proximate the TaOx layer 1560. Light from the waveguide core 1510, 1512 may be used to prevent removal of the photoresist that is exposed to light. FIG. 15B illustrates the process after the photoresist 1552 has been exposed to light and the remaining portion of the photoresist removed. The remaining photoresist is a feature (e.g., resist pillar) 1540 that is used to create the sub-micron pattern 1550. Portions of the TaOx layer around the remaining photoresist feature 1540 may be removed to create the sub-micron pattern 1550. The remaining photoresist feature 1540 may then be removed leaving the sub-micron pattern 1550 as shown in FIG. 15D.

The slider may be part of a bar array comprising a plurality of sliders. In such a case the method may further involve forming a hardmask. According to various implementations, the hardmask comprises a nonmagnetic layer (e.g., Au layer) over a first side of the bar array. The first side corresponds to waveguide entries of the sliders. The hardmask includes holes positioned over the waveguide entries. The bar array is attached to a transparent plate (e.g., quartz) such that the hardmask faces the transparent plate. A second side of the bar array is coated with the photomask. The second side corresponds to air bearing surfaces of the sliders. The transparent plate is then exposed to the light.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method, comprising:
coating an air-bearing surface of a slider with a photoresist having high optical absorbance at or near an operational wavelength of the slider;
directing light at a target wavelength through an entry of a waveguide integrated into the slider, wherein the light exiting the waveguide forms a feature through the photoresist, the feature proximate a near-field transducer of the slider; and
forming a sub-micron pattern using the feature.

2. The method of claim 1, wherein the sub-micron pattern comprises TaOx.

3. The method of claim 1, wherein forming the sub-micron pattern comprises using a step-head overcoat.

4. The method of claim 1, wherein the waveguide comprises a channel waveguide.

5. The method of claim 1, wherein the slider is part of a bar array comprising a plurality of sliders, the method further comprising:
forming a hardmask over a first side of the bar array, the first side corresponding to waveguide entries of the sliders, the hardmask including holes positioned over the waveguide entries;
attaching the bar array to a transparent plate such that the hardmask faces the transparent plate;
coating a second side of the bar array with the photomask, the second side corresponding to air bearing surfaces of the sliders; and
exposing the transparent plate to the light.

6. The method of claim 5, wherein the hardmask comprises a layer of nonmagnetic material.

7. The method of claim 6, wherein the layer of nonmagnetic material comprises Au.

8. The method of claim 1 wherein the photoresist has an optical absorbance at a wavelength to which the waveguide is tuned for operation.

9. The method of claim 1, wherein the photoresist has an optical absorbance of 830 nm.

10. The method of claim 1, wherein the sub-micron pattern is a pillar.

11. The method of claim 1, wherein the feature is a hole or a resist pillar.

12. A method, comprising:
coating an air-bearing surface of a slider with a photoresist having high optical absorbance at or near an operational wavelength of the slider;
directing light at a target wavelength through an entry of a waveguide integrated into the slider, wherein the light exiting the waveguide forms a feature through the photoresist, the feature proximate a near-field transducer of the slider; and
forming a localized step using the feature.

13. The method of claim 12, wherein the photoresist is a positive photoresist.

14. The method of claim 12, wherein the photoresist is a negative photoresist.

15. The method of claim 12, wherein the localized step comprises TaOx.

16. The method of claim 12, wherein the slider is part of a bar array comprising a plurality of sliders, the method further comprising:

forming a hardmask over a first side of the bar array, the first side corresponding to waveguide entries of the sliders, the hardmask including holes positioned over the waveguide entries;
attaching the bar array to a transparent plate such that the hardmask faces the transparent plate;
coating a second side of the bar array with the photomask, the second side corresponding to air bearing surfaces of the sliders; and
exposing the transparent plate to the light.

17. The method of claim 16, wherein the hardmask comprises a layer of nonmagnetic material.

18. The method of claim 12 wherein the photoresist has an optical absorbance at a wavelength to which the waveguide is tuned for operation.

19. The method of claim 12, wherein the photoresist has an optical absorbance of 830 nm.

20. The method of claim 12, wherein the feature is a hole or a resist pillar.

* * * * *